United States Patent [19]

Nakano et al.

[11] Patent Number: 5,247,020
[45] Date of Patent: Sep. 21, 1993

[54] PROCESS FOR PRODUCING A STYRENE POLYMER COMPOSITION

[75] Inventors: Akikazu Nakano, Osaka; Hideo Teshima; Masahiko Kuramoto, both of Ichihara, all of Japan

[73] Assignee: Idemitsu Kosan Co., Ltd., Tokyo, Japan

[21] Appl. No.: 635,286

[22] Filed: Dec. 28, 1990

[30] Foreign Application Priority Data

Jan. 30, 1990 [JP] Japan .................................. 2-17713

[51] Int. Cl.$^5$ .................. C08F 257/02; C08F 279/04; C08F 279/06; C08F 287/00; C08F 4/52; C08F 265/04; C08F 285/00
[52] U.S. Cl. .................................. 525/249; 525/247; 525/282; 525/285; 525/308; 525/309; 525/310; 525/314; 525/316; 525/322; 525/324; 525/404; 525/418; 525/426; 525/445; 525/455; 525/468; 525/479; 525/535
[58] Field of Search ............... 525/245, 247, 249, 282, 525/285, 308, 314, 316, 319, 322, 324, 404, 418, 426, 445, 455, 468, 479, 535

[56] References Cited

U.S. PATENT DOCUMENTS

| | | | |
|---|---|---|---|
| 3,018,266 | 1/1962 | Lundberg | 525/245 |
| 3,929,936 | 12/1975 | Davies et al. | 525/316 |
| 4,031,302 | 6/1977 | Shimizu et al. | 528/488 |
| 4,153,647 | 5/1979 | Glukhovskoi et al. | 525/316 |
| 4,230,836 | 10/1980 | Canterino | 525/316 |
| 4,680,353 | 7/1987 | Ishihara et al. | 526/160 |
| 4,698,394 | 10/1987 | Wong | 525/316 |
| 4,985,503 | 1/1991 | Bronstert et al. | 525/316 |
| 5,023,304 | 6/1991 | Takeuchi et al. | 526/160 |

FOREIGN PATENT DOCUMENTS 0275943 7/1988 European Pat. Off. .
0318793 6/1989 European Pat. Off. .

Primary Examiner—Vasu S. Jagannathan
Attorney, Agent, or Firm—Oblon, Spivak, McClelland, Maier & Neustadt

[57] ABSTRACT

Disclosed is a process for producing a styrene polymer composition, which comprises polymerizing styrene monomer using a catalyst comprising (A) aluminoxane and (B) a compound of the group IV B transition metal in the periodic table, in the presence of rubber-like elastomer.

The resin composition obtained thereby is superior in heat resistance, and impact strength, and utilized as the starting material for various moldings.

11 Claims, No Drawings

PROCESS FOR PRODUCING A STYRENE POLYMER COMPOSITION

BACKGROUND OF THE INVENTION

1. Field of the Invention

The present invention relates to a process for producing a styrene polymer composition, more specifically to a process for producing, with a high efficiency, a styrene polymer composition which comprises a styrene polymer having a high degree of syndiotactic configuration in its stereochemical structure of the polymer chain and a rubber-like elastomer, and which has a high dispersibility of rubber component.

2. Description of the Related Arts

Heretofore, styrene polymers produced by the radical polymerization method have an atactic configuration in stereostructure and are molded to various shapes by various molding methods such as injection molding, extrusion molding, blow molding, vacuum molding and cast molding, and they have been widely used as domestic electric appliances, office machines, household goods, packaging containers, toys, furnitures, synthetic papers and other industrial materials.

However, such styrene polymers having atactic configuration have disadvantage that it is inferior in heat resistance and chemical resistance.

The group of the present inventors has previously succeeded in developing styrene polymers having a high degree of syndiotacticity (see Japanese Patent Application Laid-Open Nos. 187708/1987, 179906/1988, 241009/1988, etc.).

Since the styrene polymers having a syndiotactic configuration have melting points which are different from those of the conventional atactic polystyrenes, and are higher than those of the isotactic polystyrenes known before, they are expected to be used as heat-resistant resins in various fields. To utilize the heat-resistance of them with good efficiency, blending them with other resins have been studied (Japanese Patent Application Laid-Open Nos. 257950/1987, 146944/1989, and 279944/1989).

In these studies, by blending these styrene polymers with a rubber-like elastomer, resin compositions having improved impact strength were obtained. In producing the compositions with rubber-like elastomer, however, blending as been effected by kneading, but a sufficient kneading has been required for improving the dispersibility. In that process, since the rubber-like elastomer is provided with elasticity, it must be cut into fine pieces before kneading, but it involved some problems owing to its elasticity.

Because of their high melting points, the styrene polymers having a syndiotactic configuration were kneaded at high temperature, but if shearing force or time for sufficient kneading became excessive, the molecular weight of the resin might be lowered or cross-linking of rubber might proceed.

Under these circumstances, the present inventors have intensively studied to develop a process for producing resin composition having a good dispersibility and a high impact strength, whereby the styrene polymer having a syndiotactic configuration and rubber-like elastomer can be blended efficiently, and the above problems are dissolved.

SUMMARY OF THE INVENTION

As the result, it was found that the above subject could be obtained by polymerizing styrene monomer in the presence of a specified catalyst in a system in which rubber-like elastomer exists. The present invention has been accomplished based on such findings.

The present invention provides a process for producing a styrene polymer composition, which comprises polymerizing a styrene monomer in the presence of rubber-like elastomer, using a catalyst composed of (A) aluminoxane and (B) a compound of transition metal belonging to the group IV B in the periodic table.

DESCRIPTION OF PREFERRED EMBODIMENTS

The rubber-like elastomers to be used in the present invention include natural rubber, polybutadiene, polyisoprene, polyisobutyrene, neoprene, ethylene-propylene copolymer rubber, polysulfide rubber, thiokol rubber, acrylic rubber, urethane rubber, silicone rubber and epichlorohydrin rubber.

The most preferable one is a rubber-like copolymer containing a styrenic compound as one component. Examples are styrene-butadiene copolymer rubber (SBR), a styrene-butadiene block copolymer (SB, SBS, BSB, etc.), a styrene-hydrogenated butadiene block copolymer (SEBS, SEB, etc.), a styrene-isoprene block copolymer (SI, SIS, ISI, etc.), a styrene-hydrogenated isoprene block copolymer (SEP, SEPS, etc.), or as described in Japanese Patent Application Laid-Open No. 292049/1989, a granular elastomer obtained by polymerizing a vinyl monomer in the presence of the polymer obtained by polymerizing at least one monomer selected from the group consisting of alkyl acrylate, alkyl methacrylate and a multi-functional monomer having a conjugated diene type double bond. Examples of the granular elastomer are acrylonitrile-styrene grafted butadiene rubber (ABS), acrylonitrile-styrene grafted butadiene-butyl acrylate copolymer rubber (AABS), methyl methacrylate-styrene grafted butylacrylate rubber (MAS), styrene grafted butadiene rubber (SB), methyl methacrylate-styrene grafted butadiene rubber (MBS) and methyl methacrylate-styrene grafted butadiene-butyl acrylate copolymer rubber (MABS).

Further, examples are one or more block or graft copolymers selected from an A-B type block copolymer, an A-grafted B copolymer and a B-grafted A copolymer, wherein A is at least one styrene polymer or styrene copolymer selected from atactic polystyrene, acrylonitrile-styrene random copolymer, styrene-maleic anhydride random copolymer, styrene-acrylonitrile-anhydrous maleimide random copolymer, styrene-methyl methacrylate random copolymer and styrene-methacrylic acid random copolymer, and B is at least one polymer selected from polybutadiene, polyisoprene, hydrogenated polybutadiene, hydrogenated polyisoprene and polycarbonate, and at least one polymer selected from polyamide, polymethyl methacrylate, polyethylene terephthalate and polybutylene terephthalate.

As the rubber-like elastomers, the commercially available products of the above-mentioned ones can be used, but preferably, the adsorption water has been previously removed away by drying treatment, and purified to remove the additives which may become the catalyst poison.

Said rubber-like elastomer is used in the state of being dissolved previously in an aromatic solvent such as benzene, toluene, ethylbenzene, and xylene, or in styrene monomer. In view of catalytic activity and productivity, preferred is a bulk polymerization system in which rubber-like elastomer is dissolved in styrene monomer, and a catalyst is added thereto, to polymerize the styrene monomer.

The amount of rubber-like elastomer varies depending on the kinds of the rubber-like elastomers or solvents, but usually it is 0.1 to 30% by weight, preferably 0.5 to 20% by weight, and most preferably 1 to 10% by weight. The rubber-like elastomer may be dissolved at room temperature or while heated properly, if necessary. Further, it is preferable to add organoaluminum compound after dissolution, to remove the poisoning material such as water which exists in the system.

The aluminoxane which is Component (A) of the catalyst to be used in the present invention is a compound obtained by contacting various organoaluminum compound with a condensing agent. As the organoaluminum compound used as a starting material, an organoaluminum compound represented by the general formula:

$$AlR^1_3 \tag{I}$$

wherein $R^1$ is an alkyl group having 1 to 8 carbon atoms, more specifically, trimethylaluminum, triethylaluminum and triisobutylaluminum can be mentioned, and trimethylaluminum is particularly preferred.

On the other hand, a typical example of the condensing agent for said organoaluminum compound is water. In addition, any compounds capable of undergoing a condensation reaction with organoaluminum compounds including alkylaluminum can be used.

As the aluminoxane of Component (A) may include chain alkylaluminoxane represented by the formula:

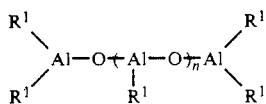

wherein n indicates polymerization degree, and a number of 2 to 50; and $R^1$ represents an alkyl group having 1 to 8 carbon atoms, and cycloalkylaluminoxane having the repeating unit represented by the general formula:

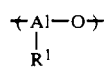

and the like. Of these alkylaluminoxanes, that wherein $R^1$ is a methyl group, i.e. methylaluminoxane is particularly preferred.

Generally, the reaction product of alkylaluminum compound such as trialkylaluminum and water includes the abovemetioned chain alkylaluminoxane and cycloalkylaluminoxane, unreacted trialkylaluminum, a mixture of various condensation products, and further complicatedly associated molecules thereof, which becomes various products according to the contacting conditions of the alkylaluminum compound and water.

The reaction of the alkylaluminum compound and water is not specified, but can be performed according to known methods; for example, (1) a method in which an alkylaluminum compound is dissolved in an organic solvent and then contacted with water; (2) a method in which an alkylaluminum compound is added at the time of polymerization, and then water is added; and (3) a method in which an alkylaluminum compound is reacted with water of crystallization as contained in metal salts and the like, or water absorbed on inorganic or organic compounds. The above water may contain ammonia, amine such as ethylamine, sulfur compound such as hydrogen sulfide, phosphorus compound such as phosphite and so on in the proportion of less than 20%.

The preferred alkylaluminoxane to be used in the present invention is prepared by the method in which, when a hydrated compound is used, the resultant solid residue is filtered after the above contact reaction and the filtrate is heated under atmospheric pressure or reduced pressure at a temperature of 30° to 200° C., preferably 40° to 150° C. for from 20 minutes to 8 hours, preferably from 30 minutes to 5 hours while removing the solvent. The temperature for the heat treatment, may be determined optionally depending on various conditions, but usually the above range can be used. If the temperature is less than 30° C., effects cannot be obtained, and if it exceeds 200° C., aluminoxane itself is undesirably pyrolyzed. Depending on the conditions of the heat treatment, the reaction product can be obtained as a colorless solid or solution. The product thus obtained can be used as a catalyst solution, if necessary, by dissolving or diluting with a hydrocarbon solvent.

Suitable examples of the alkylaluminoxane are those in which the area of the high magnetic field component in the methyl proton signal region due to the aluminum-methyl group (Al-CH$_3$) bond as observed by the proton nuclear magnetic resonance method is not more than 50% of the total signal area. That is, in a proton nuclear magnetic resonance ($^1$H-NMR) spectral analysis of a solution of the alkylaluminoxane in toluene at room temperature, the methyl proton signal due to Al—CH$_3$ is observed in the region of 1.0 to −0.5 ppm (tetramethylsilane (TMS) standard). Since the proton signal of TMS (0 ppm) is in the 1.0 to −0.5 ppm region of the methyl proton signal due to Al—CH$_3$, the alkylaluminoxane is measured with toluene as the solvent as the standard. The methyl proton signal due to Al—CH$_3$ is divided into two components: the high magnetic field component in the −0.1 to −0.5 ppm region and the other magnetic field component in the 1.0 to −0.1 ppm region. In alkylaluminoxane preferably used in the present invention, the area of the high magnetic field component is not more than 50%, preferably 45 to 5% of the total signal area in the 1.0 to −0.5 ppm region.

To the contrary, the compounds of the group IV B transition metals of the periodic table, which is Component (B) to be used as a catalyst of the present invention may include a titanium compound, and a zirconium compound, a hafnium compound. Various titanium compounds can be used and a preferred example is at least one compound selected from the group consisting of titanium compounds and titanium chelate compounds represented by the general formula:

$$TiR^2_a R^3_b R^4_c R^5_{4-(a+b+c)} \tag{IV}$$

or $$TiR^2_d R^3_e R^4_{3-(d+e)} \tag{V}$$

wherein $R^2$, $R^3$, $R^4$ and $R^5$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c are each an integer of 0 to 4; and d and e are each an integer of 0 to 3.

$R^2$, $R^3$, $R^4$ and $R^5$ in the formulae (IV) and (V) each represent a hydrogen atom, an alkyl group having 1 to 20 carbon atoms (specifically, methyl group, ethyl group, propyl group, butyl group, amyl group, isoamyl group, isobutyl group, octyl group and 2-ethylhexyl group), an alkoxy group having 1 to 20 carbon atoms (specifically, methoxy group, ethoxy group, propoxy group, butoxy group, amyloxy group, hexyloxy group, and 2-ethylhexyloxy group), an aryl group having 6 to 20 carbon atoms, an alkylaryl group, an arylalkyl group (specifically, phenyl group, tolyl group, xylyl group and benzyl group), an acyloxy group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). There $R^2$, $R^3$, $R^4$ and $R^5$ may be the same as or different from each other. Furthermore, a, b and c each are an integer of 0 to 4, and d and e each are an integer of 0 to 3.

More preferred titanium compounds include a titanium compound represented by the formula:

$$TiRXYZ \qquad (VI)$$

wherein R represents a cyclopentadienyl group, a substituted cyclopentadienyl group or an indenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group and pentamethylcyclopentadienyl group. In addition x, Y and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group, ethoxy group, propoxy group, butoxy group, amyloxy group, hexyloxy group, octyloxy group and 2-ethylhexyl group), an aryl group having 6 to 20 carbon atoms (specifically, phenyl group and naphthyl group), an aryloxy group having 6 to 20 carbon atoms (specifically, phenoxy group), an arylalkyl group having 6 to 20 carbon atoms (specifically, benzyl group) or a halogen atom (specifically, chlorine, bromine, iodine and fluorine).

Specific examples of the titanium compound represented by the formula (VIII) include
cyclopentadienyltrimethyltitanium,
cyclopentadienyltriethyltitanium,
cyclopentadienyltripropyltitanium,
cyclopentadienyltributyltitanium,
methylcyclopentadienyltrimethyltitanium,
1,2-dimethylcyclopentadienyltrimethyltitanium,
pentamethylcyclopentadienyltrimethyltitanium,
pentamethylcyclopentadienyltriethyltitanium,
pentamethylcyclopentadienyltripropyltitanium,
pentamethylcyclopentadienyltributyltitanium,
cyclopentadienylmethyltitanium dichloride,
cyclopentadienylethyltitanium dichloride,
pentamethylcyclopentadienylmethyltitanium dichloride,
pentamethylcyclopentadienylethyltitanium dichloride,
cyclopentadienyldimethyltitanium monochloride,
cyclopentadienyldiethyltitanium monochloride,
cyclopentadienyltitanium trimethoxide,
cyclopentadienyltitanium triethoxide,
cyclopentadienyltitanium tripropoxide,
cyclopentadienyltitanium triphenoxide,
pentamethylcyclopentadienyltitanium trimethoxide,
pentamethylcyclopentadienyltitanium triethoxide,
pentamethylcyclopentadienyltitanium tripropoxide,
pentamethylcyclopentadienyltitanium tributoxide,
pentamethylcyclopentadienyltitanium triphenoxide,
cyclopentadienyltitanium trichloride,
pentamethylcyclopentadienyltitanium trichloride,
cyclopentadienylmethoxyltitanium dichloride,
cyclopentadienyldimethoxytitanium chloride,
pentamethylcyclopentadienylmethoxytitanium dichloride,
cyclopentadienyltribenzyltitanium,
pentamethylcyclopentadienylmethyldiethoxytitanium,
indenyltitanium trichloride,
indenyltitanium trimethoxide,
indenyltitanium triethoxide,
indenyltrimethyltitanium and
indenyltribenzyltitanium.

Of these titanium compounds, a compound containing no halogen atom is preferred and a titanium compound having one electron type ligand as mentioned above is particularly preferred.

Furthermore, a condensed titanium compound represented by the following formula can be used as the titanium compound

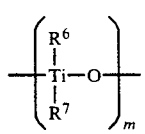

(VII)

wherein R6 and R7 each represent a halogen atom, an alkoxy group having 1 to 20 carbon atoms or an acyloxy group; and m is an integer of 2 to 20.

Furthermore, the above titanium compounds can be used in the form of a complex formed with an ester or an ether. Multidentate ligands, in which ligands are combined each other, may be used.

The trivalent titanium compound represented by the formula (V) typically includes a trihalogenated titanium such as titanium trichloride; and a cyclopentadienyltitanium compound such as cyclopentadienyltitanium dichloride, and also those obtained by reducing a tetravalent titanium compound. These trivalent titanium compounds can be used in the form of a complex formed with an ester or an ether.

In addition, the zirconium compound used as the transition metal compound includes tetrabenzylzirconium, zirconium tetraethoxide, zirconium tetrabutoxide, bisindenylzirconium dichloride, triisopropoxyzirconium chloride, zirconium benzyl dichloride and tributoxyzirconium chloride, and hafnium compound includes tetrabenzyl hafnium, tetraethoxide hafnium and tetrabutoxide hafnium. Of these transition metal compounds, the titanium compounds are particularly preferred.

In the process of the present invention, if desired, in addition to the above transition metal compound, another catalytic components such as organic aluminum can be added.

The organic aluminum includes and organic aluminum compound represented by the formula:

$$R^8{}_k Al(OR^9)_m H_p X_q \qquad (VIII)$$

wherein $R^8$ and $R^9$ each independently represent an alkyl group having 1 to 8 carbon atoms, preferably 1 to 4 carbon atoms; X represents a halogen; k, m, p and q are $0<k\leq 3$, $0\leq m<3$, $0\leq p<3$ and $0\leq q<3$, respectively, and $k+m+p+q=3$. The activity of the catalyst is further improved by adding the above compound.

The organic aluminum compound represented by the above formula (VIII) can be exemplified as shown below. Those corresponding to $p=q=0$ are represented by the formula: $R^8{}_k Al(OR^9)_{3-k}$ (wherein $R^8$ and $R^9$ are the same as those mentioned above and k is preferably a number of $1.5\leq k\leq 3$). Those corresponding to $m=p=0$ are represented by the formula: $R^8{}_k AlX_{3-k}$ (wherein $R^8$ and X are the same as those mentioned above and k is preferably a number of $0<k<3$). Those corresponding to $m=q=0$ are represented by the formula: $R^8{}_k AlH_{3-k}$ (wherein $R^8$ is the same as mentioned above and k is preferably a number of $2\leq k<3$). Those corresponding to $p=0$ are represented by the formula: $R^8{}_k Al(OR^9)_m X_q$ (wherein $R^8$, $R^9$ and X are the same as those mentioned above and $0<k\leq 3$, $0\leq m<3$, $0\leq q<3$ and $k+m+q=3$).

In the organic aluminum compound represented by the formula (VIII), the compound wherein $p=q=0$ and $k=3$ is selected from, for example, trialkylaluminum such as trimethylaluminum, triethylaluminum and tributylaluminum, or combination thereof, and those preferred are triethylaluminum, tri-n-butyl-aluminum and triisobutylaluminum. In the case of $p=q=0$ and $1.5\leq k<3$, included are dialkylaluminum alkoxide such as diethylaluminum ethoxide and dibutylaluminum butoxide; alkylaluminum sesquialkoxide such as ethylaluminum sesquiethoxide and butylaluminum sesquibutoxide; as well as partially alkoxylated alkylaluminum having en average composition represented by $R^8{}_{2.5}Al(OR^9)_{0.5}$. Examples of the compound corresponding to the case where $m=p=0$ include a partially halogenated alkylaluminum including dialkylaluminum halogenide (k=2) such as diethylaluminum chloride, dibutylaluminum chloride and diethylaluminum bromide; alkylaluminum sesquihalogenide (k=1.5) such as ethylaluminum sesquichloride, butylaluminum sesquichloride and ethylaluminum sesquibromide; and alkylaluminum dihalogenide (k=1) such as ethylaluminum dichloride, propylaluminum dichloride and butylaluminum dibromide. Examples of the compound corresponding to the case in which $m=q=0$ includes a partially hydrogenated alkylaluminum including dialkylaluminum hydride (k=2) such as diethylaluminum hydride and dibutylaluminum hydride; alkylaluminum dihydride (k=1) such as ethylaluminum dihydride and propylaluminum dihydride. Examples of the compound corresponding to the case in which p=0 include a partially alkoxylated or halogenated alkylaluminum such as ethylaluminumethoxy chloride, butylaluminumbutoxy chloride and ethylaluminumethoxy bromide (k=m=q=1). Of these, triisobutylaluminum and triisobutylaluminum hydride are particularly suitable.

The catalyst to be used in the present invention comprises Components (A) and (B) as the main components, and in addition, other catalytic components can be added if desired. The ratio of Components (A) and (B) in said catalyst depends on various conditions, and cannot be defined unconditionally, but usually it is, in term: of the ratio of aluminum in Component (A) and the metal in Component (B), i.e., aluminum/metal (molar ratio), 1 to $10^6$, and preferably 10 to $10^4$.

The methods used to produce the resin composition from these components are a method to dissolve a rubber-like elastomer into the solvent as described above, and then to add the above-mentioned catalyst and styrene monomer to start polymerization or copolymerization: or a method to dissolve the rubber-like elastomer in styrene monomer and subsequently add to catalyst to start polymerization or copolymerization. The catalytic components may be added either successively or at once, but it is preferable to add the compound of a group IV B transition metal of the periodic table as Component (B) after organoaluminum or aluminoxane as Component (A) is added, since water and the like existing in the system can be removed. As Component (A) to be added, sufficient amount for treating water or the like should be added. When styrene monomer in a prescribed amount is used for dissolving the rubber-like elastomer, the procedure to add styrene monomer further and the procedure to remove the solvent after polymerization may be omitted and thus the process can be simplified.

The styrene monomer to be used in the present invention indicates styrene and/or styrene derivatives.

Specific examples of the styrene derivatives include alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, p-tertiary-butylstyrene and p-phenylstyrene; halogenated styrenes such as p-chlorostyrene, m-chlorostyrene, o-bromostyrene, p-fluorostyrene, m-fluorostyrene, o-fluorostyrene and o-methyl-p-fluorostyrene; alkoxystyrenes such as p-methoxystyrene, m-methoxystyrene, o-methoxystyrene, p-ethoxystyrene, m-ethoxystyrene, and o-ethoxystyrene; carboxyesterstyrenes such as p-carboxymethylstyrene, m-carboxymethylstyrene, and o-carboxymethylstyrene; alkyl etherstyrenes such as p-vinylbenzylpropylether; or mixtures of two or more kinds of them.

As described above, polymerization (or copolymerization) of styrene monomer may be bulk polymerization and may be carried out in the solvents of aliphatic hydrocarbons such as pentane, hexane, and heptane; alicyclic hydrocarbons such as cyclohexane; or aromatic hydrocarbons such as benzene, toluene, ethylbenzene, and xylene, as long as rubber-like elastomer is dissolved. In view of productivity, it is preferred to polymerize styrene monomer in a high concentration.

In the present invention, polymerization of styrene monomer is effected preferably with the concentration of 50% by volume or more, and more preferably 70% by volume or more. Bulk polymerization is superior in productivity and impregnancy as described above.

Conditions for polymerization in the present invention are not limited particularly, but can be performed in the conventional manner; for example, at a temperature of 0° to 100° C., preferably 20° to 80° C. while stirring moderately. The polymerization can be ended by deactivating the catalyst with the use of alcohol as in the conventional process, and the resulting polymer can be purified by washing with alcohol, and deashing with the use of acid and alkali.

The rubber content of the resulting resin composition can be controlled by adjusting the amount of rubber dissolved, amount of catalyst added, and period of polymerization. The content of the rubber-like elastomer in the resin composition of the present invention is not critical, but usually 1 to 40% by weight, preferably 2 to 30% by weight of the amount of the composition.

The resin composition thus obtained is a blend of styrene polymer having a syndiotactic configuration and a rubber-like elastomer. Here, the styrene polymer which has a high degree of the syndiotactic configuration means that its stereochemical structure is mainly the syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrene polymers having such a high degree of syndiotactic configuration" means polystyrene, poly(alkylstyrene), poly(halogenated styrene), poly(alkoxystyrene), poly(vinyl benzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) include poly(methylstyrene), poly(ethylstyrene), poly(isopropylstyrene), poly(tert-butylstyrene), poly(-halogenated styrene) include poly(chlorostyrene), poly(bromostyrene), and poly(fluorostyrene).

The most preferred styrene polymers are polystyrene, poly(p-methylstyrene), poly(m-methylstyrene.), poly(p-tert-butylstyrene), poly(p-chlorostyrene), poly(m-chlorostyrene), poly(p-fluorostyrene), and the copolymer of styrene and p-methylstyrene.

According to the present invention, a resin composition in which rubber-like elastomer is highly dispersing in a styrene polymer having a high degree of syndiotactic configuration can be produced without kneading.

Consequently, the resin composition obtained by the process of the present invention is excellent in heat resistance and impact strength, and utilized effectively as the material for various moldings.

The present invention will be described in greater detail with reference to the following examples.

EXAMPLE 1

In a 1-liter reactor, 10 g of polybutadiene (Trade Name: NF 35 AS, produced by Asahi Chemical Industry Co., Ltd.) was placed, dried under reduced pressure, and then 400 ml of styrene was added in an atmosphere of nitrogen and the resulting mixture was stirred at room temperature, and thus polybutadiene was dissolved into styrene. After dissolved, the solution was heated to 70° C., 4 mmol of triisobutyl aluminum and 4 mmol (as aluminum atom) of methylaluminoxane were added, to be stirred for 30 minutes, and the trace amount of impurities such as water existing in the system was disposed.

Subsequently, 0.02 mmol of pentamethylcyclopentadienyl titanium trimethoxide was added, and polymerized for 30 minutes.

Then, the catalyst was deactivated with methanol, washed with methanol, then dried under reduced pressure, to obtain 40.6 g of a composition containing 10 g of polybutadiene.

It was confirmed that the polystyrene obtained by the polymerization was a syndiotactic polystyrene (SPS) having a melting point (Tm) of 270° C. The yield of said SPS was 30.6 g (conversion to styrene: 8.5%), and the content of the rubber-like elastomer was 24.6% by weight.

EXAMPLE 2

The same procedure of Example 1 was reheated except that the polymerization period was 120 minutes, to obtain a resin composition. The yield and rubber content are shown in Table 1.

EXAMPLES 3 TO 6

The procedure of Example 1 was repeated except that the kinds and amounts of the rubber-like elastomers were as shown in Table 1, to obtain resin compositions. Each yield and rubber content are shown in Table 1. Izod test sample in accordance with JIS K 7110 was formed by injection molding by the use of the resin composition obtained in Example 6, and Izod impact test (notched) was carried out. The results are shown in Table 1.

COMPARATIVE EXAMPLE 1

The procedure of Example 1 was repeated except that the rubber-like elastomer was not used, to obtain a resin composition. The yield is shown in Table 1.

TABLE 1

| No. | Rubber-like Elastomer Kind | Rubber-like Elastomer Amount (g) | Styrene Monomer (l) | Polymerization Period (min) | Yield (g) | Content of Rubber-like Elastomer (wt %) | Izod Impact Strength (kg · w · cm/cm)[*4] |
|---|---|---|---|---|---|---|---|
| Example 1 | PB[*1] | 10 | 400 | 30 | 40.6 | 24.6 | — |
| Example 2 | PB[*1] | 10 | 400 | 120 | 75.3 | 13.3 | — |
| Example 3 | SB1[*2] | 5 | 400 | 30 | 52.0 | 9.6 | — |
| Example 4 | SB1[*2] | 10 | 400 | 30 | 53.4 | 18.7 | — |
| Example 5 | SB1[*2] | 20 | 400 | 30 | 45.2 | 44.2 | — |
| Example 6 | SB2[*3] | 10 | 400 | 30 | 47.0 | 21.3 | 14.3 |

TABLE 1-continued

| No. | Rubber-like Elastomer Kind | Rubber-like Elastomer Amount (g) | Styrene Monomer (l) | Polymerization Period (min) | Yield (g) | Content of Rubber-like Elastomer (wt %) | Izod Impact Strength (kg · w · cm/cm)*4 |
| --- | --- | --- | --- | --- | --- | --- | --- |
| Comparative Example 1 | — | — | 400 | 30 | 27.4 | — | — |

*1 Polybutadiene (Trade Name: NF35AS, produced by Asahi Chemical Industry Co., Ltd.)
*2 Styrene-butadiene Rubber-like Elastomer (Trade Name: ZLS01, produced by Nippon Zeon Co., Ltd.)
*3 Styrene-butadiene Rubber-like Elastomer (Trade Name: BL6533, produced by Bayer Co.)
*4 In accordance with JISK-7110 (notched)

What is claimed is:

1. A process for producing styrene polymer composition which comprises polymerizing styrene monomer using a catalyst comprising (A) aluminoxane and (B) a compound of the transition metal belonging to the group IV B in the periodic table in the presence of a rubber elastomer copolymer containing styrene wherein the amount of rubber elastomer in the resulting styrene polymer composition is 1 to 40% by weight of the total composition.

2. The process according to claim 1, wherein the styrene polymer has a high degree of syndiotactic configuration in the stereochemical structure of the styrene polymer chain.

3. The process according to claim 2, wherein the styrene polymer having a high degree of syndiotactic configuration possesses 30% or more of syndiotacticity in terms of racemic pentad.

4. The process according to claim 1, wherein the rubber elastomer containing styrene-compound as one component is styrene-butadiene copolymer rubber, styrene-butadiene block copolymer or styrene-hydrogenated isoprene block copolymer.

5. The process according to claim 1, wherein the rubber elastomer is a granular elastomer obtained by polymerizing styrene in the presence of a polymer obtained by polymerizing at least one monomer selected from the group consisting of alkyl acrylate, alkylmethacrylate and a multi-functional monomer having a conjugated diene double bond.

6. The process according to claim 5, wherein the granular elastomer is acrylonitrile-styrene grafted butadiene rubber, acrylonitrile-styrene grafted butadiene-butyl acrylate copolymer rubber, methyl methacrylate-styrene grafted butyl acrylate rubber, styrene grafted butadiene rubber, methyl methacrylate-styrene grated butadiene rubber, or methyl methacrylate-styrene grafted butadiene-butyl acrylate copolymer rubber.

7. The process according to claim 1, wherein the rubber elastomer is at least one block or graft copolymer selected from A-B type block copolymer, an A-grafted B copolymer and a B-grafted A copolymer, wherein A is at least one styrene polymer or styrene copolymer selected from atactic polystyrene, acrylonitrile-styrene random copolymer, styrene maleic anhydride random copolymer, styrene-acrylonitrileanhydrous maleimide random copolymer, styrene-methyl methacrylate random copolymer, and styrene-methacrylic acid random copolymer, B is at least one polymer selected from polybutadiene, polyisoprene, hydrogenated polybutadiene, hydrogenated polyisoprene and polycarbonate, and at least one polymer selected from polyamide, polymethyl methacrylate, polyethylene terephthalate, and polybutylene terephthalate.

8. The process according to claim 1, wherein the content of the rubber elastomer in the styrene polymer composition is 2 to 30% by weight of the total composition.

9. A process for producing styrene polymer composition which comprises polymerizing styrene monomer using a catalyst comprising (A) aluminoxane and (B) a compound of the group IV B transition metal in the periodic table, in the presence of rubber elastomer copolymer containing styrene, dissolved in styrene monomer, wherein the amount of rubber elastomer dissolved is 0.1 to 30% by weight.

10. The process according to claim 9, wherein the amount of the rubber elastomer dissolved is 0.5 to 20% by weight.

11. The process according to claim 9, wherein the amount of rubber elastomer dissolved is 1 to 10% by weight.

* * * * *